No. 745,685.                                              Patented December 1, 1903.

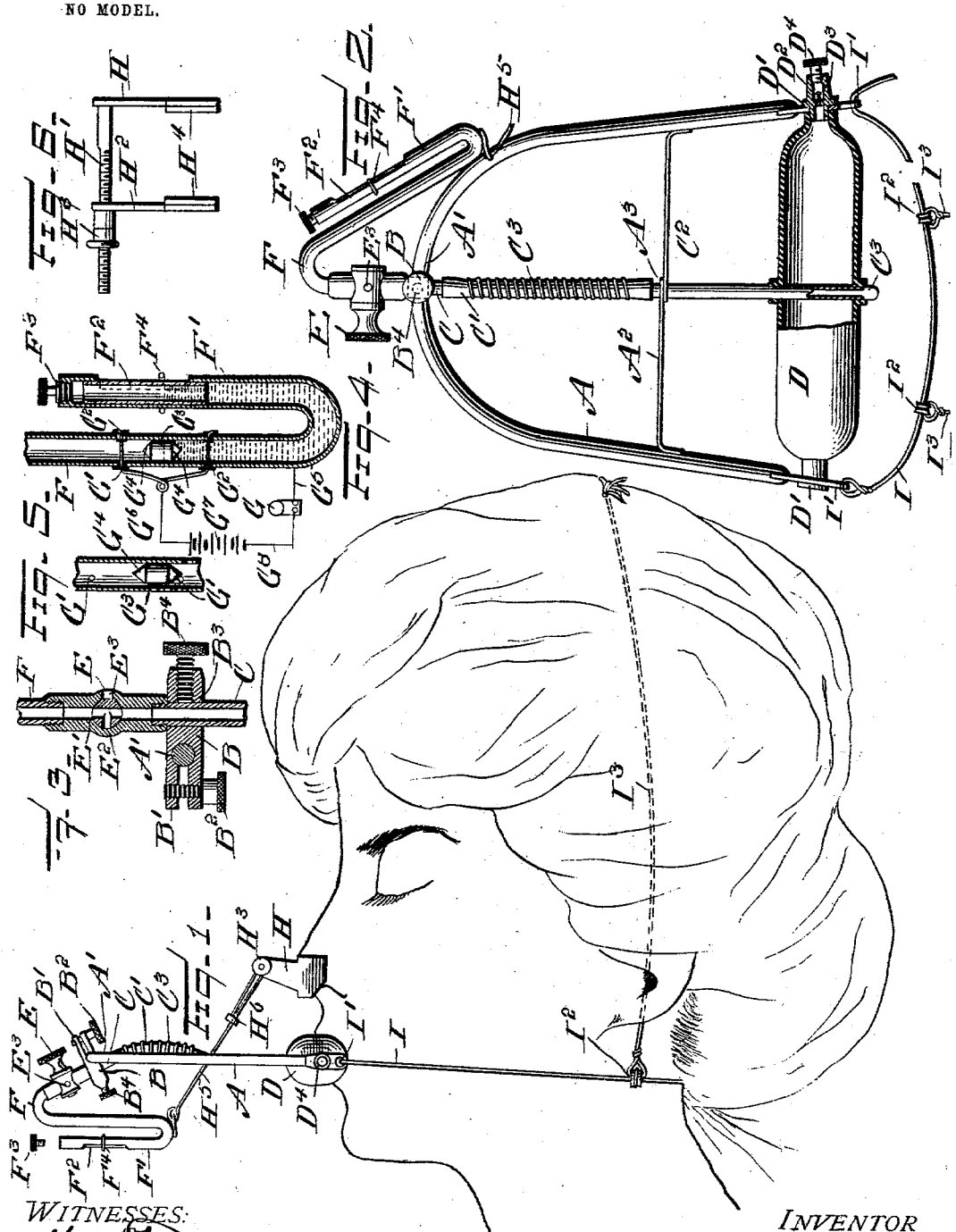

UNITED STATES PATENT OFFICE.

JORDAN E. STORMS, JR., OF YONKERS, NEW YORK.

DEATH-DETERMINING INSTRUMENT.

SPECIFICATION forming part of Letters Patent No. 745,685, dated December 1, 1903.

Application filed September 15, 1903. Serial No. 173,335. (No model.)

*To all whom it may concern:*

Be it known that I, JORDAN E. STORMS, Jr., a citizen of the United States, residing at Yonkers, in the county of Westchester, State of New York, have invented certain new and useful Improvements in Death-Determining Instruments, of which the following is a specification, reference being had therein to the accompanying drawings.

This invention relates to a death-determining instrument, and particularly to a device for indicating any movement or change of volume of the air within the lungs of a person supposed to be deceased.

The invention has for an object to provide an instrument adapted to communicate with the lungs of a person and provided with a gage to indicate any movement or change in the volume of the air within the lungs of the person, all other respiratory outlets, such as the nose and mouth, being suitably closed.

A further object of the invention is to provide means for closing the mouth-opening when the air-tube of the instrument is introduced therein and also for effecting a closure of the nostril-passages when necessary.

A further object of the invention is to mount the gage in such a manner that it can be maintained in a proper vertical position for securing an accurate movement of the liquid therein and also for providing a flexible connection between this gage and the air-tube capable of permitting such movement.

Another object of the invention is to provide means for supporting the instrument in position when a test continuing for a length of time is to be effected.

Other and further objects and advantages of the invention will be hereinafter set forth and the novel features thereof defined by the appended claims.

In the drawings, Figure 1 is an elevation showing the instrument applied for use. Fig. 2 is a front elevation of the instrument with the gage turned to one side. Fig. 3 is a detail vertical section illustrating the mounting of the gage upon the yoke or frame of the instrument for a universal movement. Fig. 4 is a similar view of the gage mechanism. Fig. 5 is a detail vertical section of one portion of this gage at right angles to Fig. 4, and Fig. 6 is a front view of the nostril-clamp.

Like letters of reference refer to like parts in the several figures of the drawings.

The letter A designates the frame of the instrument, which may be of any desired shape—for instance, arched or yoked, as shown—and is provided at the upper portion A' of such yoke with a connection B, mounted for universal movement—that is, in two planes at a right angle to each other. This mounting is herein shown as comprising a split clamp B', having a tension-screw $B^2$, and embracing the yoke A', while at one side of said yoke an aperture $B^3$ for the air-tube C is provided and said tube retained in the aperture by means of a suitable clamping-screw $B^4$. The lower end of this tube C is connected by a flexible tube C', which permits the movement of the connector B relative to the lower portion $C^2$ of the air-tube, and for the purpose of preventing the bending of this flexible tube at an acute angle the same may be wound with wire, as shown at $C^3$. The lower end $C^2$ of the air-tube is provided with an opening $C^3$, introduced into the mouth of the person, and for the purpose of permitting an air-tight closure at this point an inflatable cushion D is provided and mounted at its opposite ends D' in the lower portion of the frame or yoke. This cushion is connected to the air-tube $C^2$ to effect a tight joint where the tube passes through the cushion, and at one end a filling-aperture $D^2$ is provided for inflating the cushion, said aperture having a check-valve $D^3$ of any ordinary construction therein and may be closed beyond said valve by the plug $D^4$, if found desirable. While it is necessary in the use of this instrument to close all of the respiratory organs, still other means may be used for that purpose, the cushion D being illustrated as a convenient form of means to be carried by the instrument, although the said closing means may be independent of the instrument. The tube $C^2$ may, if desired, be suitably braced or supported by means of the cross-bar $A^2$, having a central eye $A^3$ through which the tube passes.

Attached to the upper end of the air-pipe C is a three-way cock E, having a direct passage E' and a cross-passage $E^2$, as shown in Fig. 3, while the wall of the casing for this cock is formed with a discharge-opening $E^3$.

This cock is adapted to control the passage of air to the gage, to be hereinafter described.

The gage F may be of any preferred construction, and in the present instance is shown as comprising parallel legs, the front leg F' of which is provided with a sight-opening F$^2$, secured therein, and may be closed when not in use by the plug F$^3$ at its upper end. This tube may be graduated when found desirable, and surrounding the same is a frictionally-adjustable ring F$^4$, adapted to be set at a point upon said tube corresponding to the level of liquid therein when the test is to be made.

In the case of an extended test where the instrument is to be left upon the person for a length of time an electrical connection may be used to sound an alarm G in case of movement of the air in the lungs of the person, and a desirable form thereof is shown in Fig. 4, where the conducting-wire G', preferably of platinum, is extended through the tube and protected from electrical contact therewith by means of insulating-sleeves G$^2$. Within the tube a float G$^3$ is mounted and is of a sufficiently close fit to permit the free movement thereof and yet prevent the inhalation of the liquid in the tube in the event of a reviving person taking a sudden or deep breath. The opposite ends of this float are tapered, as at G$^4$, and coated with an electrical conducting substance, such as platinum, while the tube itself is in circuit with the alarm G by means of the line G$^5$, connected therewith at any desired point. This alarm is also in circuit with the conducting-wires by means of the line G$^6$ communicating with the battery G$^7$, which is in circuit with the alarm by the line G$^8$. The conducting-wires G', located within the tube, are disposed at one side of the center thereof, so that in the event of the tapered ends of the float contacting therewith the ends will be forced into intimate contact with the tube, so as to establish a return circuit for sufficient time to sound the alarm mechanism. (See Fig. 5.)

When it is desired to close the nostrils as well as the mouth, the instrument may be provided with a clamp for that purpose comprising a plate H, having a threaded rod extending at a right angle thereto, upon which is suitably mounted a coöperating plate H$^2$, adapted to be adjusted and held in position by the nut H$^3$, threaded upon the rod H', while the contact-faces of the plates H and H$^2$ are provided with suitable cushions H$^4$, and the entire clamp may be suspended by means of a connecting-cord H$^5$ from the lower portion of the gage, which cord is provided with an adjusting-button H$^6$, so as to permit a taut connection between the clamp and gage, which assists in holding the parts in their proper position.

When the parts are to be mounted for an extended test, it is desirable to retain them upon the person by a suitable means. For instance, a cord I may extend from an eye I' at the lower end of the yoke upon one side of the cushion to a similar eye upon the opposite side, while carried by the cord are rubber frictional buttons I$^2$, held thereon in their ajusted position, from which a head-cord I$^3$ is adapted to extend at each side beneath the ear of the person and connected upon the head to retain the parts in their proper position, as illustrated in Fig. 1.

In the operation of the invention the cushion is inflated to the proper extent to make an air-tight connection by adjusting itself to the lips of the person, which may be moistened, or preferably coated with vaseline, prior to the application of the cushion. The gage is then adjusted upon the holder, so as to lie in a vertical position, while the holder itself is maintained in a line parallel with the lips and may be so maintained by the hand of the operator if a short test is desired, or if a more extended test is to be made may be supported by the cords, as shown in Fig. 1, while the necessary pressure upon the cushion to maintain an air-tight contact is secured in the latter event by the proper tightening of the cord passing at the back of the neck. When the parts are thus adjusted, the plug at the free end of the gage is removed and the glass tube filled to the desired extent with liquid, while the cock controlling the air-pipe is turned to bring the short passage in connection with the outlet in the casing, thus admitting to the air-tube the pressure of the atmosphere. The cock is then closed by reversing the position of the short passage therein until it is opposite the solid wall of the casing, which establishes communication between the lungs of the person and the liquid in the gage. The ring upon the gage is first set at the level of the liquid in the tube, while the free hand of the operator is used to close the passage of the nostrils by pressing them together, or they may be closed by the clamp shown. As the respiratory-passages communicating with the lungs are entirely closed, it will be obvious that the slightest change in the volume of air in the lungs or the movement thereof will instantly raise or lower the liquid in the gage, so that not the slightest symptom of restoration or breathing incident to the revival of the supposed deceased person can escape detection by the instrument. It will also be evident that if under an extended test no such change occurs in the level of the liquid all indications of life are absent. In such an extended test the electrical connection shown in Fig. 4 has been found very convenient, and the float therein used also prevents the liquid being drawn into the lungs of the person in case of an inhalation incident to the revival or a reëstablished respiratory action. It will also be obvious that by turning the stop-cock in proper position the communication with the gage may be cut off and an opening provided to the lungs of the person, so that in case of symptoms of revival it is only necessary to turn this cock in order that the patient may have the air while the instrument is being removed. It will also be obvious that changes may be made in the details of construction and configuration without departing from the spirit of the invention as defined by the appended claims.

Having described my invention and set forth its merits, what I claim, and desire to secure by Letters Patent, is—

1. In a death-determining instrument, an air-tube adapted to communicate with the lungs of a person, a gage carried by said tube, and means other than said tube for forcibly effecting an air-tight connection with the lips of the person.

2. In a death-determining instrument, an air-tube adapted to communicate with the lungs of a person, a gage carried by said tube, means other than said tube for forcibly effecting an air-tight connection with the lips of the person, and a frame supporting said air-tube and said air-tight means.

3. In a death-determining instrument, an air-tube adapted to communicate with the lungs of a person, a gage carried by said tube, means for effecting an air-tight connection with the lips of the person, a frame supporting said air-tube and said air-tight means, and means for permitting an oscillation of said gage upon said frame in two different planes.

4. In a death-determining instrument, an air-tube adapted to communicate with the lungs of a person, a gage carried by said tube, means for effecting an air-tight connection with the lips of the person, a frame supporting said air-tube and said air-tight means, means for permitting an oscillation of said gage upon said frame in two different planes, and a stop-cock having a discharge-opening and adapted to establish communication between said gage and air-pipe.

5. In a death-determining instrument, an air-tube adapted to communicate with the lungs of a person, a gage carried by said tube, means for effecting an air-tight connection with the lips of the person, a frame supporting said air-tube and said air-tight means, means for permitting an oscillation of said gage upon said frame in two different planes, a stop-cock having a discharge-opening and adapted to establish communication between said gage and air-pipe, an alarm mechanism carried by said gage.

6. In a death-determining instrument, an air-pipe, a gage comprising parallel legs one of which is provided with a sight-glass, a flexible connection between said gage and air-pipe, a frame provided with a fixed support for said air-pipe, and means for mounting said gage for oscillatory movement upon the frame.

7. In a death-determining instrument, an air-pipe, a gage comprising parallel legs one of which is provided with a sight-glass, a flexible connection between said gage and air-pipe, and a three-way cock for establishing communication between the air-pipe and gage.

8. In a death-determining instrument, an air-pipe, a gage comprising parallel legs one of which is provided with a sight-glass, a flexible connection between said gage and air-pipe, a three-way cock for establishing communication between the air-pipe and gage, an adjustable ring upon said sight-glass, and means for mounting said gage for oscillatory movement upon the frame.

9. In a death-determining instrument, an air-pipe, a gage comprising parallel legs one of which is provided with a sight-glass, a flexible connection between said gage and air-pipe, a three-way cock for establishing communication between the air-pipe and gage, an adjustable ring upon said sight-glass, means for mounting said gage for oscillatory movement upon the frame, conducting-rods extending through one leg of said gage, a battery and alarm in circuit with said rods and the body of the gage, and a float within the gage having conducting-surfaces adapted to establish circuit between said rods and the body of the gage.

10. In a death-determining instrument, an air-pipe, a gage communicating therewith and comprising parallel legs adapted to contain a body of liquid, conducting-rods extending transversely of one of said legs, a battery and alarm device in circuit with said rods and the body of the gage, and a float having contacting surfaces at its ends adapted to engage said rods in the movement of the liquid within the gage.

11. In a death-determining instrument, an air-pipe, a gage communicating therewith and comprising parallel legs adapted to contain a body of liquid, contacting rods extending transversely of one of the legs, a battery and alarm device in circuit with said rods and the body of the gage, and a float having at opposite ends tapered conducting-surfaces to establish circuit between said rods and gage in the movement of the liquid within the gage.

12. In a death-determining instrument, a supporting-frame, an air-pipe and gage carried thereby, a supporting-cord extending from one leg of said frame to the other, and an auxiliary cord frictionally supported upon the supporting-cord and extending laterally thereof.

13. In a death-determining instrument, a supporting-frame, an air-pipe and gage carried thereby, a supporting-cord extending from one leg of said frame to the other, an auxiliary cord frictionally supported upon the supporting-cord and extending laterally thereof, an inflatable cushion at the lower end of said frame through which the air-pipe extends, and a clamp for adjustably mounting said pipe upon said frame.

14. In a death-determining instrument, a supporting-frame, an air-pipe and gage carried thereby, a supporting-cord extending from one leg of said frame to the other, an auxiliary cord frictionally supported upon the supporting-cord and extending laterally thereof, an inflatable cushion at the lower end of said frame through which the air-pipe extends, a clamp for adjustably mounting said pipe upon said frame, and a nostril-clamp comprising relatively movable parts adjustably connected with said gage.

15. In a death-determining instrument, a yoke-frame, an inflatable cushion supported at the lower end thereof, an air-pipe extending through said cushion and provided with a flexible section, an adjustable support carried upon the frame, means for adjusting the air-pipe in said support, and a gage device carried by the upper end of said air-pipe.

16. In a death-determining instrument, a yoke-frame, an inflatable cushion supported at the lower end thereof, an air-pipe extending through said cushion and provided with a flexible section, an adjustable support carried upon the frame, means for adjusting the air-pipe in said support, a gage device carried by the upper end of said air-pipe, a three-way cock between said gage and air-pipe, and a plug for the free end of said gage.

17. In a death-determining instrument, a nostril-clamp comprising a plate having a threaded arm extending at an angle thereto, a coöperating plate adjustable on said arm, and a nut for adjusting said coöperating plate.

18. In a death-determining instrument, means for indicating the movement or expansion of air within the lungs of a person, an air-pipe communicating with the indicating means and means other than the air-pipe for forcibly closing the respiratory passages.

19. In a death-determining instrument, a yoke-frame, an inflatable cushion supported at the lower end thereof, an air-pipe extending through said cushion, and an inflating-tube for said cushion provided with an inwardly-opening check-valve therein.

20. In a death-determining instrument, a yoke-frame, an inflatable cushion supported at the lower end thereof, an air-pipe extending through said cushion, an inflating-tube for said cushion provided with an inwardly-opening check-valve therein, and a plug for the outer end of said tube.

21. In a death-determining instrument, a fixed air-pipe, a gage supported by a framework to oscillate thereon, a flexible connection between said gage and air-pipe, and a coiled wire surrounding said flexible connection.

22. In a death-determining instrument, an air-pipe, a gage supported by a framework, a flexible connection between said gage and air-pipe, and a cross-bar extending between the opposite sides of the frame through which the flexible connection passes.

23. In a death-determining instrument, a supporting-frame, an air-pipe and gage carried thereby, a supporting-cord extending from one leg of said frame to the other, elastic frictional buttons slidingly mounted upon said cord, and an auxiliary cord connected to said buttons and extending laterally from the supporting-cord.

In testimony whereof I affix my signature in presence of two witnesses.

JORDAN E. STORMS, JR.

Witnesses:
CHARLES E. ALLISON,
CHAS. H. ALLISON.